(12) United States Patent
Amouroux et al.

(10) Patent No.: US 10,895,503 B2
(45) Date of Patent: Jan. 19, 2021

(54) MEDICAL DEVICE FOR FIBRED BIMODAL OPTICAL SPECTROSCOPY

(71) Applicants: UNIVERSITE DE LORRAINE, Nancy (FR); CENTRE NATIONAL DE LA RECHERCHE SCIENTIFIQUE, Paris (FR)

(72) Inventors: Marine Amouroux, Pulnoy (FR); Walter Blondel, Pulnoy (FR); Alain Delconte, Villier-lès-Nancy (FR)

(73) Assignees: UNIVERSITE DE LORRAINE, Nancy (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/779,377

(22) PCT Filed: Nov. 30, 2016

(86) PCT No.: PCT/EP2016/079274
§ 371 (c)(1),
(2) Date: May 25, 2018

(87) PCT Pub. No.: WO2017/093316
PCT Pub. Date: Jun. 8, 2017

(65) Prior Publication Data
US 2018/0348056 A1 Dec. 6, 2018

(30) Foreign Application Priority Data
Nov. 30, 2015 (FR) ...................... 15 61599

(51) Int. Cl.
*G01J 3/36* (2006.01)
*G01J 3/10* (2006.01)
(Continued)

(52) U.S. Cl.
CPC ............... *G01J 3/36* (2013.01); *G01J 3/0218* (2013.01); *G01J 3/0221* (2013.01); *G01J 3/10* (2013.01);
(Continued)

(58) Field of Classification Search
CPC ........................................... G01J 3/36
(Continued)

(56) References Cited

U.S. PATENT DOCUMENTS 8,189,196 B2    5/2012  Belz
8,244,332 B2    8/2012  Azar et al.
(Continued)

OTHER PUBLICATIONS

French Search Report from French Patent Application No. 1561599, dated Jul. 22, 2016.
(Continued)

*Primary Examiner* — Tarifur R Chowdhury
*Assistant Examiner* — Omar H Nixon
(74) *Attorney, Agent, or Firm* — Greer, Burns & Crain, Ltd.

(57) ABSTRACT

A bimodal optical spectroscopy device for producing spectra of autofluorescence and diffuse reflectance signals from a biological sample such as skin. Identified are: an excitation unit including a plurality of monochrome light-emitting diodes and a wideband pulsed lamp; a flexible optical probe including a distally arranged excitation optical fibre, at the centre of the flexible optical probe, to consecutively carry the excitation signals from each element of the excitation unit to the biological sample, and a plurality of distally arranged receiving optical fibres arranged in concentric circles around the excitation optical fibre to carry signals coming from the sample; a detection unit including a plurality of spectrometers, each receiving signals from receiving optical fibres arranged on a single circle in the optical
(Continued)

probe; a filter wheel for eliminating excitation signals; and a processing unit for controlling the excitation and detection units and for synchronizing between the units during measurements.

13 Claims, 2 Drawing Sheets

(51) Int. Cl.
  *G01J 3/44* (2006.01)
  *G01J 3/02* (2006.01)
  *G01N 21/25* (2006.01)
  *G01N 21/359* (2014.01)
  *G01N 21/64* (2006.01)

(52) U.S. Cl.
  CPC .......... *G01J 3/4406* (2013.01); *G01N 21/255* (2013.01); *G01N 21/359* (2013.01); *G01N 21/645* (2013.01); *G01J 2003/102* (2013.01); *G01N 2021/6471* (2013.01); *G01N 2021/6484* (2013.01)

(58) Field of Classification Search
  USPC .......................................................... 356/326
  See application file for complete search history.

(56) References Cited

U.S. PATENT DOCUMENTS

| | | | |
|---|---|---|---|
| 2003/0127588 A1* | 7/2003 | Martinez | G01B 11/14 250/231.13 |
| 2004/0054270 A1 | 3/2004 | Pewzner et al. | |
| 2004/0073120 A1* | 4/2004 | Motz | A61B 5/0071 600/478 |
| 2007/0167836 A1 | 7/2007 | Scepanovic et al. | |
| 2008/0097174 A1 | 4/2008 | Maynard et al. | |
| 2009/0043296 A1 | 2/2009 | Foster et al. | |
| 2009/0087134 A1* | 4/2009 | Martinez | G01B 11/14 385/12 |
| 2010/0056928 A1* | 3/2010 | Zuzak | A61B 5/0071 600/476 |
| 2010/0302537 A1* | 12/2010 | Chauchard | G01N 21/474 356/317 |
| 2010/0302538 A1* | 12/2010 | Chauchard | G01N 21/49 356/317 |
| 2011/0112435 A1* | 5/2011 | Ramanujam | A61B 5/0071 600/567 |
| 2012/0075625 A1* | 3/2012 | Tamura | G01N 21/9501 356/237.5 |
| 2012/0245473 A1* | 9/2012 | Mycek | A61B 5/0071 600/479 |
| 2015/0018644 A1* | 1/2015 | Gulati | G01N 21/359 600/316 |
| 2015/0216398 A1 | 8/2015 | Yang et al. | |
| 2015/0377787 A1 | 12/2015 | Zeng et al. | |
| 2016/0116410 A1* | 4/2016 | Blasinski | G01N 21/6456 702/189 |

OTHER PUBLICATIONS

International Search Report from International Patent Application No. PCT/EP2016/079274, dated Feb. 20, 2017.
Written Opinion of the International Searching Authority from International Patent Application No. PCT/EP2016/079274, dated Feb. 20, 2017.
Amouroux, M. (2008). "Caractérisation de la transformation néoplasique de la peau par spectroscopies optiques sur fantôme de mélanome et carcinome épidermoïde murin photo-induit" (Thesis for Doctoral Dissertation), Cellular and Tissue Engineering. Retrieved from Institut National Polytechnique de Lorraine. <tel-00339385>.
Diaz-Ayil, Gilberto. (2009). Spectroscopie optique mult-modalités in vivo: instrumentation, extraction et classification diagnostique de tissus sains et hyperplasiques cutanés (Thesis for Doctoral Dissertation), Engineering Sciences. Retrieved from Institut National Polytechnique de Lorraine.<tel-00440463>.
Diaz-Ayil et al., "Spatially-Resolved Bimodal Spectroscopy for Classification/Evaluation of Mouse Skin Inflammatory and Pre-Cancerous Stages," Optical Sensing II (2009), vol. 7368, pp. 73680F1-73680F8.

* cited by examiner

MEDICAL DEVICE FOR FIBRED BIMODAL OPTICAL SPECTROSCOPY

BACKGROUND

The present invention relates to a fibred bimodal optical spectroscopy device for generating and recording spectra of autofluorescence and diffuse reflectance signals originating from a biological sample.

The invention relates to the field of fibred optical spectroscopy applied to the detection of precancerous lesions. The purpose of the invention is to non-invasively detect and characterize lesions that are precancerous and difficult to detect clinically. Certain pathological and early metabolic and morphological changes modify the optical properties of biological tissues at the subcellular, cellular and tissue level. The challenge consists of finding in the intensity spectra acquired distinguishing information associated with the characteristics and concentrations of the constituent elements (absorbers, diffusers and endogenous fluorophores), in order to be able to determine in situ the nature of the tissue.

Methods of fibred optical spectroscopy have been studied, in particular in the thesis by Marine Amouroux in 2008 (http://docnum.univ-lorraine.fr.bases-doc.univ-lorraine.fr/public/SCD_T_2008_0050_AMOUROUX.pdf), as well as the thesis by Gilberto Diaz in 2009 (http://docnum.univ-lorraine.fr/public/INPL/2009_DIAZ_AYIL_G.pdf).

These two theses describe a sequential excitation carried out with a technological solution based on a short arc xenon source associated with band-pass filters and variable linear filters in order to select narrow bands. This embodiment has in particular the major drawback of releasing a large amount of heat, which is prohibitive in terms of passing the tests for CE marking according to European Directive 93/42/EEC.

Document U.S. Pat. No. 8,189,196 is known that describes a fibred optical spectroscopy device using excitation light-emitting diodes. The excitation wavelengths are from 260 nm to 1400 nm. An injector makes it possible to inject several monochromatic sources in an optical fibre assembly (this assembly being called "optical probe"). Each light source passes through the probe so as to generate at the output several beams supplying different samples. On reception, photodiodes are used to detect the light that has passed through the samples.

Document U.S. Pat. No. 8,244,332 is also known, describing a laser scanner device capable of carrying out spectroscopy. Laser diodes and a tungsten-halogen lamp make it possible to carry out spectral measurements over 30 to 45 seconds using an optical fibre which conveys the signals originating from the sample to the spectrometer.

Document US 20090043296 is also known, describing a laser treatment system using two spectroscopy devices to monitor the spectral properties of the sample. Two detection optical fibres are used to emit and detect signals generated by light-emitting diodes. Each detection optical fibre is intended to collect signals originating from a given area, on or on the periphery of the lesion. The source of white light used is a tungsten-halogen source or a xenon source.

The devices of the prior art are often bulky and require significant durations for the spectral measurements.

The purpose of the present invention is a novel device that is not bulky, which conforms to the electromagnetic compatibility, electrical security and photobiological requirements specific to medical devices.

Another purpose of the invention is a novel device that is rapid in terms of spectral measurements.

Another purpose of the invention is an entirely novel device having high diagnostic precision.

SUMMARY

At least one of the aforementioned objectives is achieved with a bimodal optical spectroscopy device for producing spectra of autofluorescence and diffuse reflectance signals originating from a biological sample, this device comprising:
- an excitation unit constituted by several monochromatic light-emitting diodes and a polychromatic lamp,
- a flexible optical probe constituted by an excitation optical fibre arranged, on the distal side, at the centre of the flexible optical probe in order to successively convey the excitation signals from each element of the excitation unit to the biological sample, and several receiving optical fibres arranged, on the distal side, in the form of concentric circles around the excitation optical fibre in order to convey signals originating from the sample,
- a detection unit comprising several spectrometers, each receiving signals originating from receiving optical fibres arranged in one and the same circle in the optical probe,
- a filter wheel for removing excitation signals, and
- a processing unit for controlling the excitation and detection units and for ensuring synchronization between these units during measurements.

By distal side is meant the end of the flexible optical probe intended to be arranged on or close to the sample, the proximal side being the end connected to the illumination and detection functional units.

The spectra obtained are light irradiance measurements as a function of the wavelength.

With the device according to the invention, several light-emitting diodes are used, each emitting at a reduced frequency band distinct from the others so as to have a good spectral resolution at excitation. At detection, several groups of receiving optical fibres are advantageously used. Each group comprises several optical fibres arranged in a circle centred around the excitation optical fibre. Arranging several optical fibres on one and the same circle makes it possible to optimize (in terms of signal-to-noise ratio) the signal recorded at each distance from the excitation optical fibre while limiting the illumination irradiance to which the sample (in particular a patient) is subjected in order to obtain autofluorescence in particular. Each circle thus formed corresponds to a distance with the excitation fibre and to a depth in the sample like human or animal skin. In fact, it has been shown that the further away from the centre of the excitation light, the more signals are collected originating from layers deeper in the sample. For example, ideally haemoglobin is detected with optical fibres arranged at a greater distance from the excitation optical fibre as haemoglobin is more abundant in the deeper layers of the skin. The use of several spectrometers synchronized with the control of the excitation signals makes it possible to both improve the purity of the signal recorded and to access the spectral information which characterizes the signals collected. Thus, different intensities are acquired originating from different depths by arranging the receiving optical fibres in concentric circles. At each excitation, the spectrometers collect all of the signals from the useful area simultaneously and under the same light conditions. The useful area is the anatomical surface contained in the circle with the greatest diameter.

With the device according to the invention, each spectrometer collects signals originating from a group of optical fibres, therefore from one and the same depth in the sample. The sum of the signals from the optical fibres associated with one and the same circle make it possible to have a signal that is more intense and therefore more significant as it is characterized by a better signal to noise ratio. This particular configuration makes it possible to have a spatial resolution with a signal quality which improves the diagnostic precision. In this way, information is accessed over different depths of the sample.

The signals originating from the sample are backscattered signals or signals generated by the sample after excitation.

The device according to the invention constitutes in particular a tool for assisting diagnostic orientation by proposing automated classification (thus independent of the level of expertise of the clinician) of cutaneous sites in the histological classifications of clinical interest.

Use of light-emitting diodes and the spatial configuration of the flexible optical probe makes it possible to obtain a short acquisition duration, and thus to respect the exposure limits of the cutaneous surface to light rays. Too long an exposure could lead to burns or mutagenic effects specific to ultra-violet rays.

The device according to the invention thus makes it possible to carry out spatially resolved fibred spectroscopy, coupling measurements of spectra of autofluorescence intensity (AF) of multiple excitations (UVA-Visible) and measurements of spectra of diffuse reflectance (RD). The bimodal character is the fact of obtaining these two types of spectrum. It has been shown that bimodality and multiple excitation made it possible to combine several types of information and thus improve the diagnostic precision.

A conventional xenon lamp (continuous excitation) has a maximum lifetime of 300 hours. In the prior art, such a short arc xenon lamp is used in association with a complex system of band-pass filters and linear variable filters in order to isolate the monochromatic filters at excitation.

In the present invention, the use of light-emitting diodes allows high frequencies and a lifetime of several thousand hours, at least 10,000 hours. By way of example, an acquisition sequence (a series of successive excitations of the light-emitting diodes and of the polychromatic lamp) can be carried out in approximately 6 seconds.

According to an advantageous characteristic of the invention, the polychromatic lamp is a pulsed lamp.

Such a lamp has reaction times compatible with sequential use. Advantageously, the precision of synchronization between the polychromatic lamp and the spectrometers is optimal since the emission from the pulsed lamp is controlled in terms of the number of pulses. The spectrometers recording the signal from the lamp are therefore synchronized with this number of pulses and not with a duration of emission of the lamp, thus allowing a quicker measurement. A conventional xenon lamp is either on or off and passing quickly from one state to the other compromises its operation.

According to an advantageous characteristic of the invention, the polychromatic lamp can be a pulsed xenon lamp emitting white light.

Such a pulsed xenon lamp is wide band and has numerous advantages, such as:
  very precise control of the emission by the number of pulses per second, and
  giving off a greatly reduced amount of heat with respect to a conventional xenon lamp which gives off an amount of heat that is prohibitive for use as a medical device.

According to an advantageous embodiment of the invention, there are six monochromatic light-emitting diodes and each emits at a different wavelength.

These monochromatic light-emitting diodes can advantageously emit respectively at the following wavelengths: 365 nm, 375 nm, 385 nm, 395 nm, 405 nm and 415 nm.

The fluorescence spectroscopy applied to diagnosis of normal and abnormal human tissues often requires a complete characterization of the absorption and fluorescence properties in the UVA-Visible-NIR wavelength range.

In this way, excitation according to the invention using several successive wavelengths potentially makes it possible to excite different fluorophores, making it possible for example to achieve more complex emission models in the form of excitation-emission matrices.

By way of a non-limitative example, there are four spectrometers, each being intended to receive signals originating from receiving optical fibres associated with one and the same of said concentric circles. Using four spectrometers makes it possible to achieve an optimum in terms of diagnostic precision. Using more or less spectrometers could lead to a loss of diagnostic precision or a signal surplus that is too weak to be usable.

Unlike certain devices of the prior art which use a spectrograph as detection unit, in the present invention a limited assembly of spectrometers is used. This makes it possible to reduce the bulk and the fragility, and therefore to improve the compactness and the ergonomics of use. The cost and the weight of the device are reduced with respect to the use of a spectrograph which is generally equipped with a camera comprising photosensitive sensors.

With four spectrometers, the quality of the recording of the signal is improved since with the single spectrometer, there is a risk of crosstalk between different receiving optical fibres. A person skilled in the art would not be prompted to replace one spectrograph with several spectrometers since he would have been stopped by the difficulty of synchronizing several spectrometers. The present invention resolves the problem of synchronization by using, for example, in the processing unit, a hardware trigger obtained by configuring a microcontroller and by using 8 pin DIN cables in order to synchronize the detection unit with respect to the excitation unit but also the 4 spectrometers between themselves, thus ensuring perfectly simultaneous recording of the spectrometers. Simultaneity is important for ensuring that the signals are acquired for one and the same anatomical site. Hardware synchronization provides a level of precision which does not exist if the synchronization is carried out by using software. By hardware synchronization is meant an electronic instruction, typically a rising or falling edge or a pulse, transmitted by the processing unit to the spectrometers via a cabled electronic connection between the processing unit and each of the spectrometers. A rising edge is thus sent to each of the spectrometers. This connection is in particular direct.

According to an advantageous embodiment of the invention each spectrometer has a slit-shaped opening which is a function of the distance between the associated concentric circle and the excitation optical fibre. Preferably, the further the concentric circle is from the excitation optical fibre, the larger the slit-shaped opening of the corresponding spectrometer.

Using a larger slit at the input of a spectrometer allows a greater quantity of light signal to enter, which is advantageous for detecting signals originating from optical fibres that are further away, on the distal side, of the excitation optical fibre. The optical fibres that are furthest away are those which carry the least intense signals. Such an implementation makes it possible to improve the quality of the signal detected, i.e. a better signal-to-noise ratio. However, in the case where a single spectrograph is used, a single slit is used for all of the optical fibres (more or less distant from the excitation optical fibre on the distal side).

According to a characteristic of the invention, the flexible optical probe can comprise six receiving optical fibres per concentric circle. Each circle advantageously corresponds to signals originating from a different depth of the sample.

According to an advantageous characteristic of the invention, the device can comprise an excitation optical injector comprising on the one hand several inputs connected respectively to the monochromatic light-emitting diode assembly and to the polychromatic pulsed lamp, and on the other hand to an output connected to the same excitation optical fibre.

Moreover, the device according to the invention can also comprise a first and a second support on either side of the filter wheel, the first support bearing a connector for each group of detection optical fibres associated with one of said concentric circles; the second support bearing connectors, each equipped with at least one optical fibre for conveying respectively the signals originating from said groups of optical fibres to the respective spectrometers. Preferably, the supports are fixed and it is the wheel which revolves depending on the filter to be presented opposite all of the groups of optical fibres.

The excitation optical injectors can consist of a merging of several optical fibres to a single optical fibre.

According to another aspect of the invention, a bimodal optical spectroscopy method is proposed for producing spectra of autofluorescence and diffuse reflectance signals originating from a biological sample, this method comprising the following steps:

successive excitations of the sample by means of light-emitting diodes and a pulsed lamp through a single excitation optical fibre arranged at the centre of a flexible optical probe on the distal side, at each excitation, simultaneous detection of the autofluorescence and diffuse reflectance signals by means of detection optical fibres of the flexible optical probe arranged on the distal side in the form of concentric circles around the excitation fibre, reception of signals originating from optical fibres by several different spectrometers, each spectrometer receiving signals originating from optical fibres associated with one and the same concentric circle, so as to produce a spectrum.

The measurements collected using this technique are sets of intensity spectra as a function of the emission wavelengths (several hundreds), the excitation wavelengths and wavelengths of a limited number of receiving optical fibres (spatial resolution with three to six concentric circles). These sets of multidimensional data can be used for a diagnostic classification by signal processing comprising the steps of pre-processing of the spectra, selecting the discriminating spectroscopic features, and multi-category classification. It is thus possible to achieve a non-invasive optical characterization of the tissues.

According to an advantageous embodiment, during an excitation cycle, the light-emitting diodes and the pulsed lamp can be illuminated for different durations.

According to the invention, during a photon collection cycle, the spectrometers can each collect photons for different durations.

Of course, the different characteristics, forms, variants and embodiments of the invention can be associated with each other in various combinations to the extent that they are not incompatible or mutually exclusive.

BRIEF DESCRIPTION OF THE DRAWINGS

Other advantages and characteristics of the invention will become apparent on examination of the detailed description of an embodiment which is in no way limitative, and the attached drawings, in which.

DETAILED DESCRIPTION

A device allowing the production of intensity spectra as a function of the wavelength will now be described. Analysis of these spectra would make it possible to characterize the nature of the tissue analysed. It is in particular a fibred optical spectroscopy for non-invasively detecting and characterizing lesions that are precancerous and difficult to classify clinically. Excitation of the tissue by light beams generates autofluorescence and reflectance signals which, once captured, give the pathological or not pathological state of the tissue. In fact, certain pathological and early metabolic and morphological changes modify the optical properties of the biological tissues at the subcellular, cellular and tissue level.

The device according to the invention makes it possible to carry out fibred spectroscopy by coupling measurements of intensity spectra of autofluorescence (AF) in multiple excitations (UV-Visible) and measurements of spectra of diffuse reflectance (DR).

The number of fluorophores that will be excited and the importance of their respective contribution to the emission of tissue autofluorescence depends on the wavelength selected to illuminate the tissue. For example, a blue light excitation (around 410 nm) will cause a strong emission of flavins (maximum molar extinction coefficient around this wavelength) but would not excite practically any other fluorophore. On the other hand, a wavelength of around 360 nm allows the excitation of collagen, NADH and, to a much lesser degree, flavins. Depending on the excitation wavelength used, it is thus possible to selectively observe the emissions of different fluorophores and the spectrum of tissue autofluorescence will result from the superposition of these different emissions.

According to the invention, by way of non-limitative example, the use of six excitation wavelengths ranging from 365 nm to 415 nm is envisaged.

Figure 1:
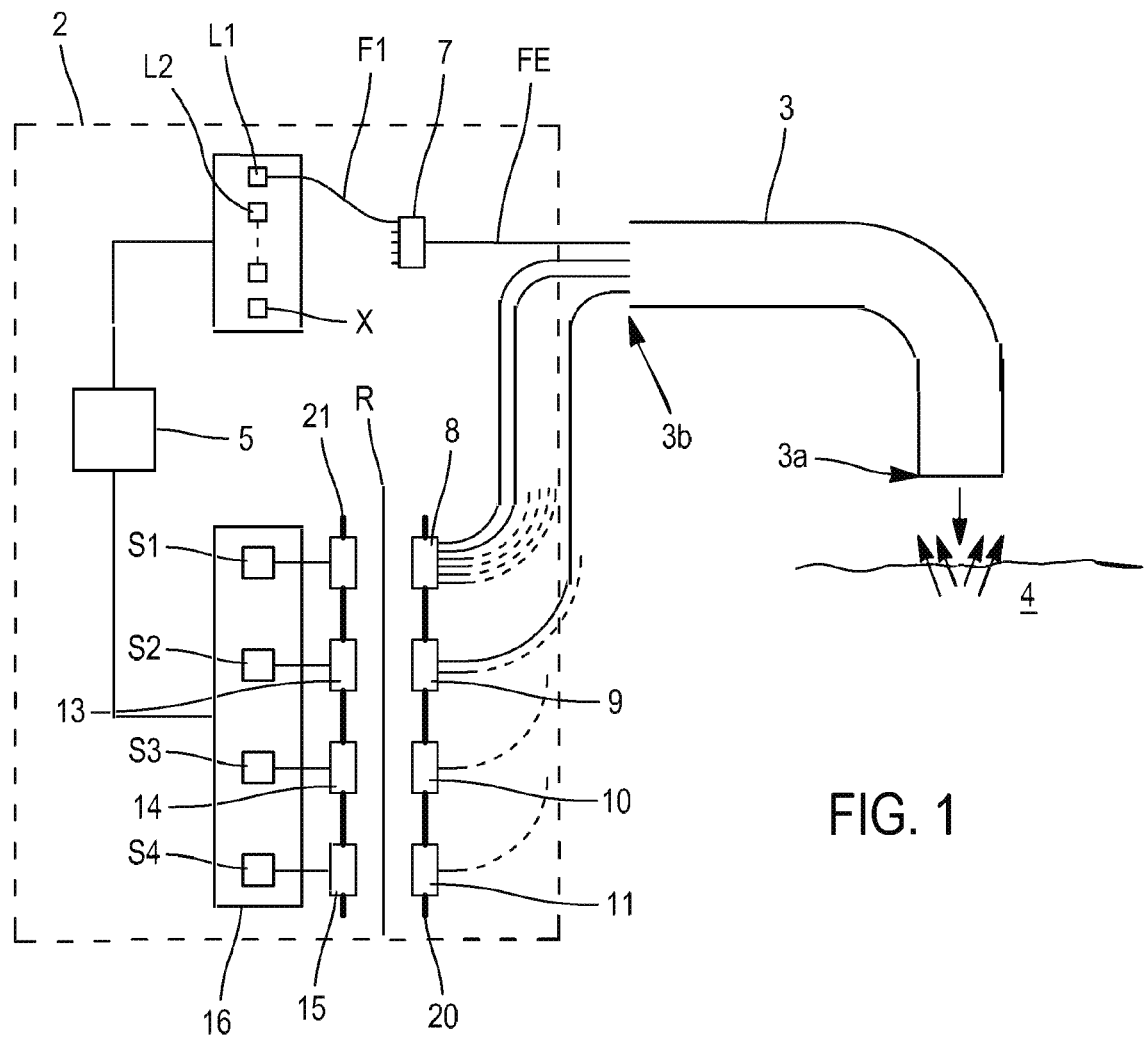
FIG. 1 is a simplified diagrammatic view of a device according to the invention.

FIG. 1 illustrates a highly simplified diagram of the device according to the invention. In a general manner, the device according to the invention 1 is seen comprising a casing 2 and a flexible optical probe 3 connected to the casing 2 and intended to come into proximity with or be placed on a skin 4 to be analysed.

Figure 3:
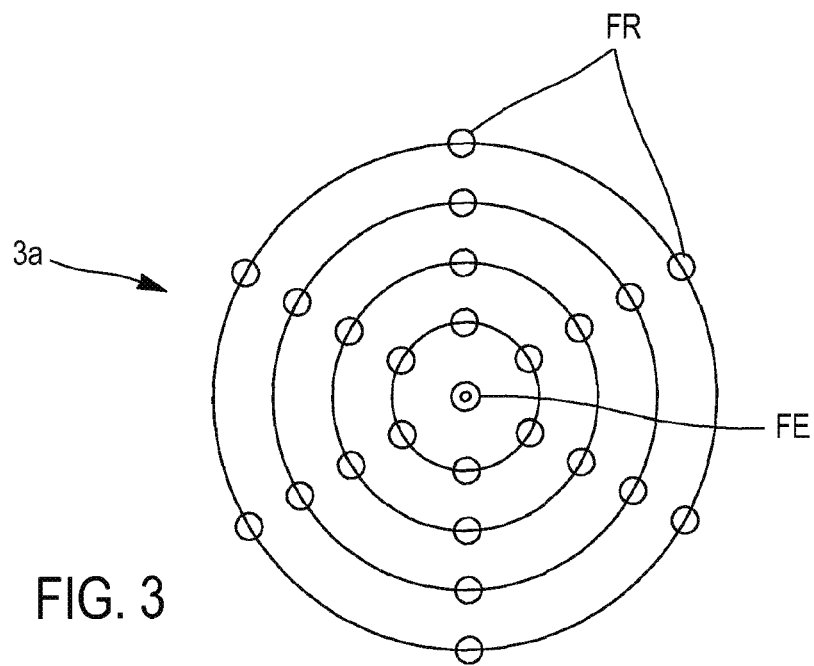
FIG. 3 is a simplified diagrammatic front view of the distal end of the flexible optical probe according to the invention.

The casing 2 comprises a processing unit 5 equipped with hardware and software means for controlling other components contained in the casing. The excitation unit 6 comprises six light-emitting diodes and a pulsed xenon lamp. The elements of the excitation unit are activated sequentially one after the other. When the light-emitting diode L1 is supplied, its excitation light beam is conveyed by means of the optical fibre F1 to the excitation optical injector 7 which comprises a single output optical fibre FE which constitutes the central optical fibre of the flexible optical probe 3. This excitation optical fibre FE leads to the distal end 3a of the flexible optical probe 3 such that the light beam originating from the optical fibre L1 is directed towards the biological sample 4. The different layers of the sample react, emitting autofluorescence signals which are captured by the receiving optical fibres FR arranged around the excitation optical fibre. FIG. 3 shows a distribution of the optical fibres constituting the flexible optical probe, in a front view from the distal end. The excitation optical fibre is in a central position, the receiving optical fibres FR are in groups of six, each group forming a circle centred on the excitation optical fibre FE. Four groups can be seen, each intended to capture signals originating from a different depth of the skin. The receiving optical fibres FR located far away from the centre of the circle capture the signals originating from the greatest depths. In the present case, signals are captured over four thicknesses.

By way of example, the diameters of the optical fibres are defined as follows:
 optical fibres connected to the light sources: 200 micrometres,
 excitation optical fibre (distal end in contact with the biological sample) to which the six optical fibres connected to the light sources transmit their light: 600 micrometres,
 receiving optical fibres: 200 micrometres.

The diameters of the circles along which are arranged the receiving optical fibres centred around the central excitation optical fibre are defined as follows: 400, 600, 800 and 1,000 micrometres (+/−50 micrometres) respectively for each of the four concentric circles.

Figure 4:
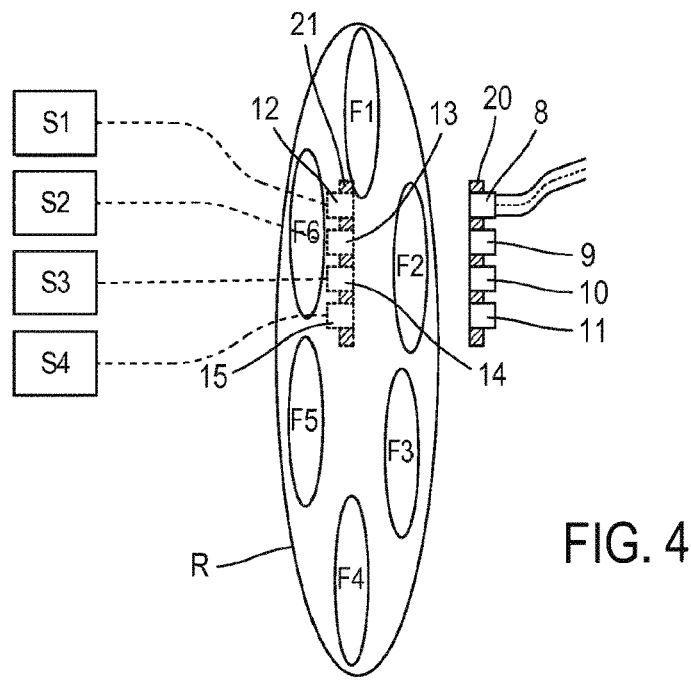
FIG. 4 is a simplified diagrammatic view of the arrangement of the filter wheel.

The intensity level at the output of the excitation optical fibre over the spectral band comprised between 300 and 700 nm can be depending on the light source:
 for the 365 nm diode: 5,852 W/m$^2$/sr
 for the other diodes: between 30,000 and 45,000 W/m$^2$/sr
 for the white lamp: 41 W/m$^2$/sr At the proximal end 3b on FIG. 1, the receiving optical fibres FR of each group are introduced respectively into the connectors 8, 9, 10 and 11 borne by a first support 20. A filter wheel R is controlled so as to interpose a high-pass filter characterized by the cut-off wavelength which makes it possible to reject the excitation wavelength used. In FIG. 4 an example of the arrangement of the filter wheel R is shown. This wheel is in the form of a rotating disc comprising several filters, six in the context of the example in FIG. 1, F1 to F6, corresponding to the six excitation light-emitting diodes. The filters are in the form of discs distributed on the periphery of the wheel. Other forms can be used. The first support 20 is designed to keep the four groups of optical fibres fixed, each comprising six detection optical fibres. At each excitation, the wheel R revolves (controlled by the processing unit) in order to present, opposite all of the of the groups, the filter corresponding to the excitation signal. On the other side of the filter, a second support 21 keeps connectors 12, 13, 14 and 15 fixed facing connectors 8, 9, 10 and 11 respectively. The connectors 12, 13, 14 and 15 convey the filtered signals from the four groups of detection optical fibres respectively to the four spectrometers S1, S2, S3 and S4. The second support 21 can be screwed onto the filter wheel. It can be a support for SMA connectors to which four optical fibres connect in order to convey the light from the filter wheel, after the light has passed through the correct filter, to the spectrometers. Preferably, no filter is applied for an excitation white light.

The spectrometers are therefore supplied simultaneously at each excitation. Once the light-emitting diode L1 is excited, then the light-emitting diode L2 is excited and so on until the pulsed xenon lamp X is excited. The processing unit 5 manages the synchronization between the different units and recaptures the spectra for processing before display on incorporated display means.

Figure 2:
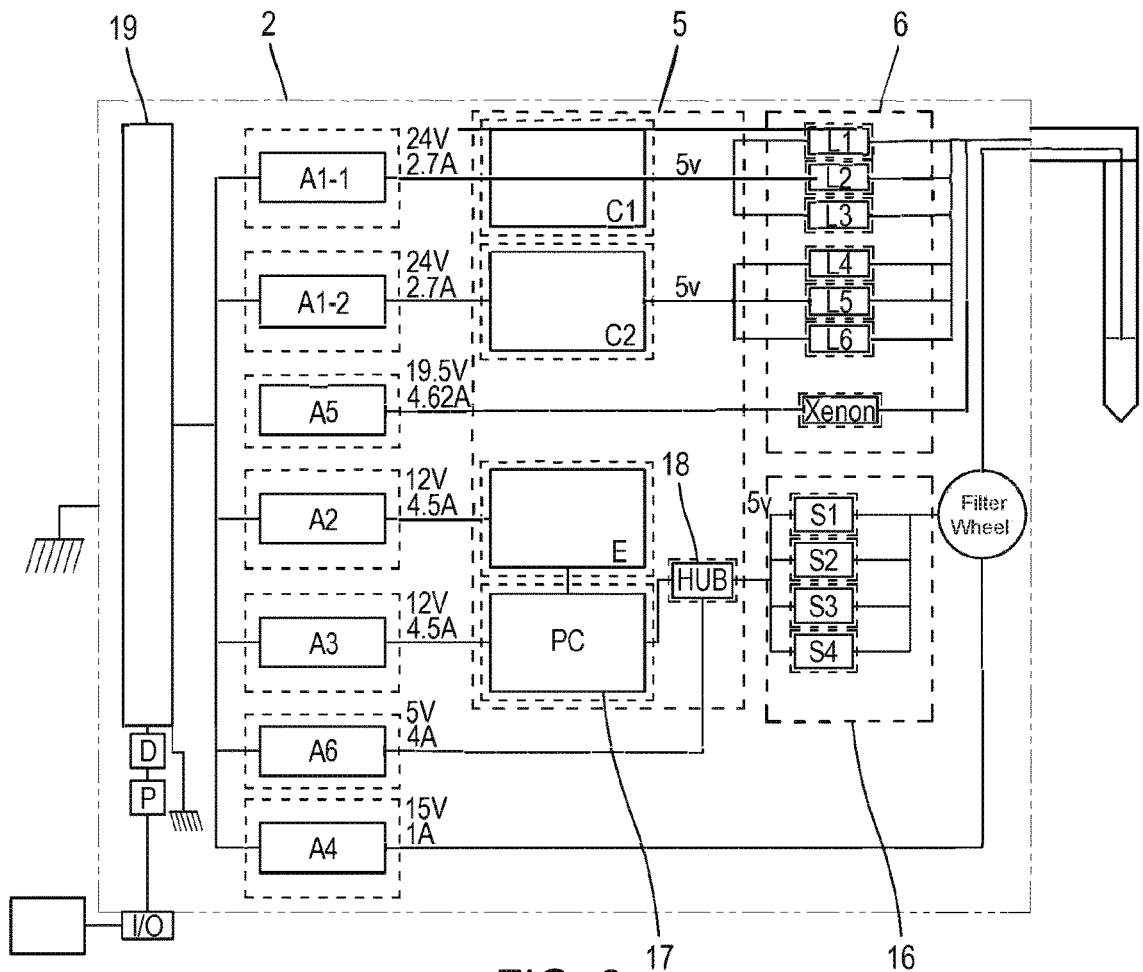
FIG. 2 is a simplified diagrammatic view of an implementation example of the device according to the invention.

In FIG. 2 an implementation example of the device according to the invention, and more particularly the casing 2 in FIG. 1 can be seen in slightly more detail.

The excitation unit can be seen comprising the six light-emitting diodes L1 to L6 and the xenon flash lamp X, i.e. a pulsed lamp. The light-emitting diodes emit monochromatic light, the emission spectral bands of which are for example respectively centred at 365, 375, 385, 395, 405 and 415 nm. The emission spectral bands each preferably have a width at half maximum of about ten nm. The xenon flash lamp itself emits a white (polychromatic) light. In practice, there are two controllers C1 and C2 intended to control the activation and extinction of the light-emitting diodes, as a function of the instructions originating from the computer 17. The first controller C1 controls the light-emitting diodes L1 to L3. The second controller C2 controls the light-emitting diodes L4 to L6. The xenon flash lamp is controlled directly by the computer 17. Each element of the excitation unit is intended to emit a light ray into the flexible optical probe 3, with an external diameter of two millimetres and a length of two metres, constituted by several optical fibres. The excitation optical fibre arranged inside the probe serves to convey the light to the biological sample (skin, for example) to be analysed. Several receiving optical fibres serve to convey the light from the biological sample to the spectrometers which will analyse this light and provide information about the nature of the biological sample. As specified previously, the receiving optical fibres are arranged in groups.

The detection unit comprises four spectrometers S1, S2, S3 and S4 which record the spectra of the light originating from the skin in order for them to then be analysed. Advantageously, the spectrometers are synchronized in a cabled or hardware manner. According to the invention, a microcontroller 18 is used to simultaneously generate a rising edge (0-5V) to the four spectrometers by means of four, eight pin DIN cables. The activation is simultaneous and the signals are thus acquired depending on the four distances for the one and only anatomical site. This arrangement is more advantageous than using a USB bus of the computer in order to address them using software, i.e. a sequential activation of the four spectrometers, with the risk of relative displacement of the probe with respect to the sample during the sequence. It is preferable that a first spectrometer records a spectrum originating from the same anatomical site as the 4th spectrometer for example.

The results can appear on a touch screen E connected to the computer 17. The processing unit 5 is constituted by the controllers C1, C2, the computer 17, the touch screen E as well as the microcontroller 18 interposed between the computer and the spectrometers so as to control the latter.

The supply units A1 to A6 are distributed in order to supply all of the components of the casing 2. Each supply is configured by voltage and amperage as a function of the component to be supplied. These supplies are connected to a power strip 19 connected to the electricity grid via means of protection such as a circuit breaker D and a lightning arrestor P.

All of the device can be in the form of a mobile rack mounted on castors for example and constituted by three shelves on which the components described above are fixed. The dimensions of this rack can be approximately 1 m in height and 0.6 m in width and in depth.

The computer is configured to control and synchronise the excitation and detection units so that:
  the lighting can be sequential, i.e. consist of a lighting sequence of the six light-emitting diodes and of the xenon flash lamp successively, each lighting (excitation) for a duration of the order of a second, and
  recording of the emission spectra is ensured for each excitation.

The invention is remarkable, in particular but not only, by the fact that the light originating from the sample, in particular from the cutaneous surface, is acquired at several sites for one and the same light excitation site for all of these sites. Such an implementation allows a higher spatial resolution.

The detection principle is based on the fact that autofluorescence in healthy and tumor tissues has significant differences both in the intensity and the form of the emission spectra. Normal, precancerous and cancerous tissues have differences at the level of spectral intensity in autofluorescence, absorption and diffusion in the visible-near IR (infrared) band. These spectral modifications are associated with alterations in the types of tissues, concentrations of fluorophores, the structure and the vascularization of the tissues which vary according to its healthy or tumorous nature.

The main clinical advantages of detection by means of autofluorescence resides in the non-invasive and atraumatic nature of the measurement. In addition, because of its spectral resolution, it has a high sensitivity to the biochemical composition of tissues, which makes it possible to reveal a priori the existence of early lesions and to provide various items of information on the structure of the sample studied. The use of the flexible optical probe makes it possible to easily access the inside of anatomical cavities, where necessary.

The device according to the invention is a tool for assisting diagnostic orientation in order to non-invasively detect and characterize precancerous lesions. The technological solutions implemented make it possible to obtain good quality signals for optimized diagnostic precision and quick measurements. Its limited production cost and its compactness give it optimum ergonomics in order to facilitate use in a clinical situation.

Of course, the invention is not limited to the examples which have just been described and numerous adjustments can be made to these examples without exceeding the scope of the invention.

The invention claimed is:

1. A bimodal optical spectroscopy device for producing spectra of autofluorescence and diffuse reflectance signals originating from a biological sample, this device comprising:
  an excitation unit constituted by several monochromatic light-emitting diodes and a polychromatic lamp;
  a flexible optical probe constituted by an excitation optical fiber arranged, on a distal side, at a center of the flexible optical probe to successively convey the excitation signals from each element of the excitation unit to the biological sample, and several receiving optical fibers arranged, on the distal side, in the form of concentric circles around the excitation optical fiber to convey signals originating from the sample;
  a detection unit comprising several spectrometers, each of the spectrometers receiving signals originating from the receiving optical fibers arranged on the same circle in the optical probe, the spectrometers being respectively connected to the circles;
  a filter wheel for removing excitation signals; and
  a processing unit for controlling the excitation and detection units and for ensuring synchronization between these units during measurements.

2. The device according to claim 1, wherein the polychromatic lamp is a pulsed lamp.

3. The device according to claim 1, wherein the polychromatic lamp is a pulsed xenon lamp emitting white light.

4. The device according to claim 1, wherein the detection unit includes four spectrometers, each of the four spectrometers being configured to receive signals originating from receiving optical fibers associated with the same concentric circle of said concentric circles.

5. The device according to claim 4, wherein each of the spectrometers has a slit-shaped opening which is a function of the distance between the associated concentric circle and the excitation optical fiber.

6. The device according to claim 5, wherein, the further the concentric circle is from the excitation optical fiber, the larger the slit-shaped opening of the corresponding spectrometer.

7. The device according to claim 1, wherein the flexible optical probe contains six receiving optical fibers per concentric circle.

8. The device according to claim 1, wherein the treatment unit comprises a hardware trigger to synchronize the detection unit with respect to the excitation unit.

9. The device according to claim 1, wherein a rising edge is sent to each of the spectrometers.

10. The device according to claim 1, further comprising an excitation optical injector including several inputs connected respectively to the monochromatic light-emitting diode assembly and to the polychromatic pulsed lamp, or connected to the excitation fiber.

11. The device according to claim 1, further comprising a first and a second support on either side of the filter wheel, the first support bearing in a fixed manner a connector for each group of detection optical fibers associated with one of said concentric circles; the second support bearing connectors each equipped with at least one optical fiber for conveying respectively the signals originating from said groups of optical fibers to the respective spectrometers.

12. A bimodal optical spectroscopy method for producing spectra of autofluorescence and diffuse reflectance signals originating from a biological sample, this method comprising the following steps:
  successively exciting the sample by means of light-emitting diodes and a pulsed lamp through a single excitation optical fiber arranged at a center of a flexible optical probe on a distal side;
  simultaneously detecting, at each excitation, the autofluorescence and diffuse reflectance signals by means of detection optical fibers of the flexible optical probe arranged on the distal side in the form of concentric circles around the excitation fiber; and
  receiving signals originating from optical fibers by several different spectrometers, each of the spectrometers receiving signals originating from receiving optical fibers associated with the same concentric circle, the spectrometers being respectively connected to the circles, so as to produce a spectrum.

13. The method according to claim 12, wherein during a photon collection cycle, the spectrometers are each suitable for collecting photons for different durations.

\* \* \* \* \*